Figure 1:
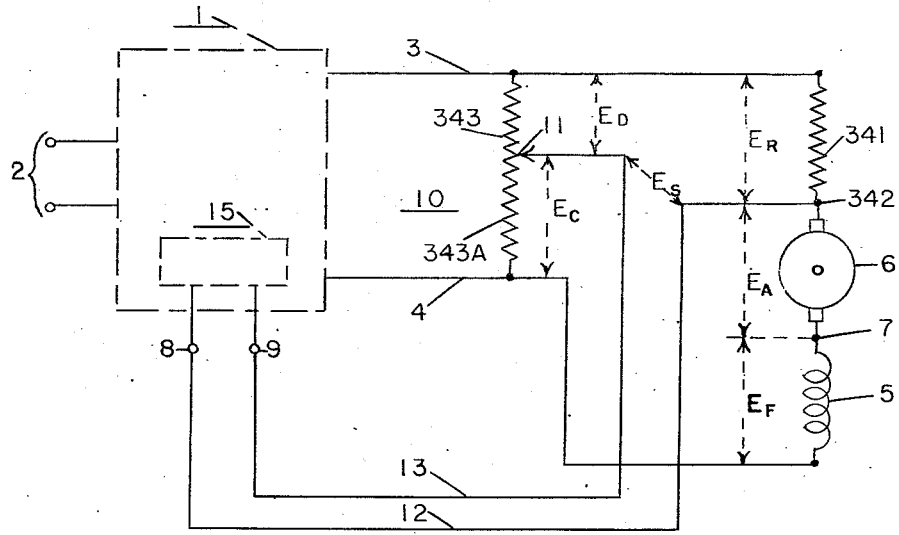

July 16, 1957 W. J. BROWN 2,799,819
SPEED CONTROL FOR A SERIES WOUND ELECTRIC MOTOR
Filed April 19, 1954 5 Sheets-Sheet 1

INVENTOR.
WALTER J BROWN
BY
*James B. Grant*
ATTORNEY

July 16, 1957  W. J. BROWN  2,799,819
SPEED CONTROL FOR A SERIES WOUND ELECTRIC MOTOR
Filed April 19, 1954  5 Sheets-Sheet 3

INVENTOR.
WALTER J BROWN
BY
James B. Grant
ATTORNEY

July 16, 1957 W. J. BROWN 2,799,819
SPEED CONTROL FOR A SERIES WOUND ELECTRIC MOTOR
Filed April 19, 1954 5 Sheets-Sheet 5

INVENTOR.
WALTER J BROWN
BY James B. Grant
ATTORNEY

United States Patent Office 2,799,819
Patented July 16, 1957

2,799,819

SPEED CONTROL FOR A SERIES WOUND ELECTRIC MOTOR

Walter J. Brown, Stamford, Conn.

Application April 19, 1954, Serial No. 424,476

31 Claims. (Cl. 318—246)

This invention relates in general to electric drives including electrical control systems for adjusting and/or controlling an electric converter, and more particularly to such systems in which the converter comprises one or more space discharge devices or rotating electrical machines having an output which is controllable by means of a relatively small signal voltage applied to control terminals of the converter.

One object of the invention is to provide a simple control system which permits the use of a single converter for supplying both the armature and field of the motor.

Another object of the invention is to provide a wide range of control of both the armature and field voltages and thus to enable the motor speed to be adjusted over a wide range.

Another object of the invention is to provide such a system which enables the speed of the motor to be controlled so as to remain substantially constant at a selected value irrespective of fluctuations in the load on the motor.

Another object of the invention is to control the output of the converter by a quantity which is dependent on the relation between the voltage across a series-wound motor and the current through the motor, thus tending to maintain constant speed irrespective of load changes.

Another object of the invention is to control the output of the converter by a quantity which is dependent on the ratio between the voltage across a series-wound motor and a non-rectilinear (hereinafter referred to as "non-linear") function of the motor current, thus tending to maintain constant speed in spite of magnetic saturation in the motor.

The parent application Serial Number 222,378, filed April 23, 1951, now Patent 2,733,395, and two continuing applications numbered 352,428 and 352,429, both filed May 1, 1953, describe systems for adjusting or controlling a series wound electric motor supplied from a controllable converter, in which the output of the converter is controlled by a quantity dependent upon the relation between the voltage across the motor armature and the voltage across or the current in a motor series field winding. The converter may be arranged to develop a small output voltage referred to in the parent specification as a "priming" voltage, even when no signal quantity is applied to the controllable converter. Arrangements are also described, with reference to Figs. 7, 8, 12, 14, 18, 24 and 25 of my co-pending applications for deriving a feedback voltage (Ex) which is approximately proportional to the motor field flux, by means of two serially connected resistive elements having different voltage coefficients of resistance. One of said elements may comprise Thyrite selenium or other semiconductor having a non-linear resistance characteristic. By suitable adjustment this will compensate for the non-linear relation of field flux to field voltage which is caused by magnetic saturation, and thus maintain substantially constant motor speed regardless of load (under steady-state conditions).

The arrangements described in this application are generally similar to those described in my co-pending application, Serial No. 352,429, filed May 1, 1953, except that the output of the converter is controlled by a quantity which is dependent upon the relation between the voltage across the armature and field windings of the series-wound motor, and a function of the motor current. In the arrangements of Figs. 17, 18, 19, 20, 24 and 25 of my co-pending application, Serial No. 352,429, the converter output is controlled by a quantity which is dependent upon the ratio between the motor armature voltage and a function of the field current, and for this purpose a "voltage-measuring circuit" such as the potential divider 10 (Figs. 17, 18, 24 and 25) or the circuit 500 (Figs. 19 and 20) is connected across the armature and in some cases across at least part of a series resistor, but the voltage measuring circuit is not connected across the field winding. In each of these figures, the "lower" terminal of the voltage-measuring circuit is connected to the common point 7 between the armature and field windings, so that the voltage across the field winding is not applied to the voltage-measuring circuit.

Alternative arrangements will now be described with continuing reference to Figures 1–9 of the drawing which schematically illustrate such arrangements, in which the voltage measuring circuit is connected across the field winding as well as the armature winding, for instance by connecting the lower end of the voltage-measuring circuit to the lower output conductor 4 of the converter instead of to the common point 7 between the armature and field windings. In most of the arrangements to be described it is unnecessary to make any connection to the intermediate point 7, so that it is possible to use the simplest type of series-wound or universal motor having only two terminals.

Fig. 1 illustrates an alternative arrangement in schematic form. Many of the circuit elements are similar to those of Fig. 17 and are similarly numbered and their description will not be repeated. However, in Fig. 1, the lower end of the potential divider 10 is connected to the conductor 4 instead of to the common point 7.

In operation, the output of converter 1 is continuously regulated so as to maintain only a small difference of potential $E_S$ between the control terminals 8 and 9, and therefore between the junction point 342 and the tapping point 11 to which the control terminals are connected by conductors 12 and 13. Accordingly, the output of the converter will always be such that the ratio of the total motor voltage ($E_A+E_F$) to the voltage drop ($E_R$) in the series resistor 341 is maintained substantially equal to the ratio of the resistances of portions 343A and 343 of the potential divider 10. Since the field current is directly proportional to the voltage drop in the series resistor 341, the total motor voltage ($E_A+E_F$) will be maintained at all times proportional to the field current. It will now be shown that this tends to maintain the speed of the motor constant, at a value which may be theoretically independent of the load, while it is dependent upon the position of the tapping point 11.

Referring to Fig. 1 various voltages are indicated as follows:

$E_R$=voltage across series resistor 341.
$E_A$=armature voltage.
$E_F$=field voltage.
$E_C$ and $E_D$ are the voltages across the lower and upper portions 343A and 343 of the potential divider 10, respectively.
$E_S$=signal voltage between the points 11 and 342.
Let $R_A$=resistance of armature and $R_F$=resistance of field.
Let $E_B$=armature counter-E. M. F. and $N$=armature speed.
Let $I$=motor current and $\phi$=field flux.

Let $k_1$ and $k_2$ be constants, depending on the motor design.

Assuming that the converter has a pure D. C. output and that the motor field is free from magnetic saturation, we have:

Armature counter-E. M. F., $E_B = k_1 \cdot N\phi = k_2 \cdot N \cdot I$
Total armature voltage $E_A = E_B + IR_A$
$= k_2 \cdot N \cdot I + I \cdot R_A$
Field voltage $E_F = I \cdot R_F$
Total motor voltage $= E_A + E_F$
$= k_2 \cdot N \cdot I + I \cdot R_A + I \cdot R_F$
$= (k_2 N + R_A + R_F) I$ Also, voltage across series resistor $E_R = I \cdot R$ Now, assuming that the control device is infinitely sensitive, so that $E_S = 0$, we have:

$$\frac{E_A + E_F}{E_R} = \frac{E_C}{E_D} = \text{a constant } k_c \text{ dependent only on the potential divider ratio}$$

Substituting the above values for $E_A + E_F$ and for $E_R$, we have:

$$\frac{(k_2 N + R_A + R_F) I}{I \cdot R} = \frac{E_C}{E_D} = k_c$$

$$\frac{k_2 N + R_A + R_F}{R} = k_c$$

$$k_2 N + R_A + R_F = k_c \cdot R$$

$$k_2 N = k_c \cdot R - R_A - R_F$$

$$N = \frac{k_c \cdot R - R_A - R_F}{k_2} = \text{constant}$$

Hence, for a given motor, the speed is theoretically independent of the load and is dependent only on the ratio $k_c$ of the potential divider.

In the above calculations, steady-state conditions have been assumed and any transient voltages resulting from change of current in the inductive field and armature windings have been ignored. Various alternatives will now be described, in which compensation is provided for such transient changes.

Figure 2:
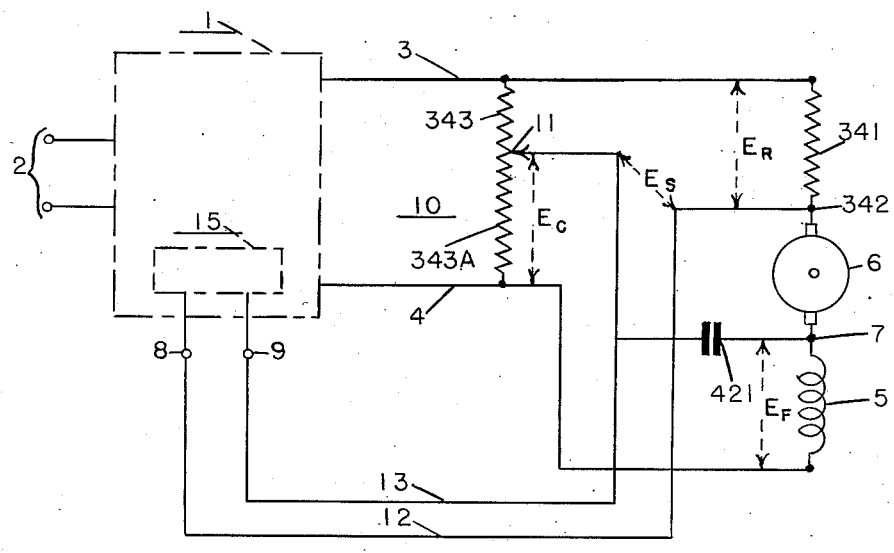

Fig. 2 shows an arrangement which is similar to Fig. 1 except that a condenser 421 is connected between the tapping point 11 and the common point 7 between the field winding 5 and the armature winding 6, for the following reason. If the mechanical load on the motor is suddenly increased, the armature will slow down, thus reducing the counter-E. M. F. and allowing the motor current to increase, thus increasing the voltage drop $E_R$ across series resistor 341 and increasing the signal voltage $E_S$ so as to increase the converter output and restore the armature speed to its original value. However, the motor current may not increase as rapidly as desired, due to the inductance of the field winding which may cause the field voltage $E_F$ to increase rather than causing $E_R$ to increase; this may excessively delay the desired increase in signal voltage $E_S$. However, the condenser 421 will transmit the transient increase of field voltage $E_F$, so that the voltage $E_C$ across the lower portion 343A of potential divider 10 is increased, thus raising the potential at tapping point 11 and temporarily increasing the signal voltage $E_S$ so as to increase the converter output with the desired promptness.

Figure 3:
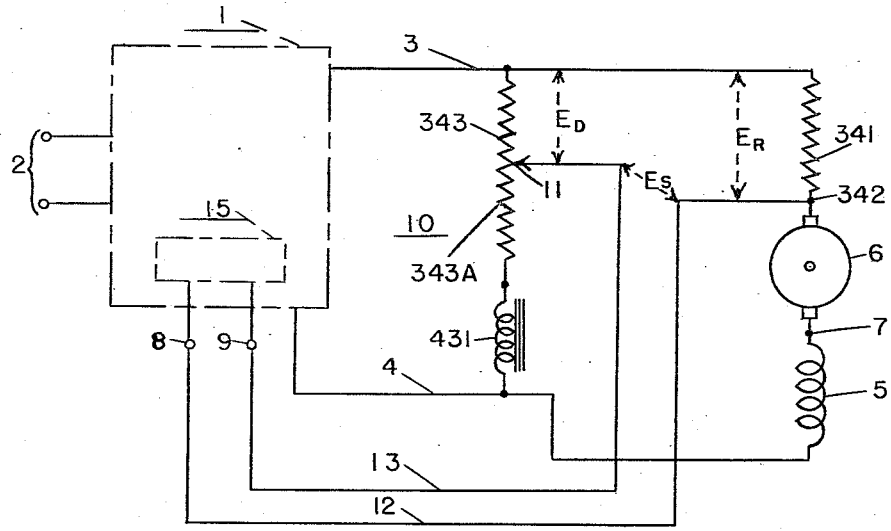

The alternative arrangement shown in Fig. 3 is similar to that shown in Fig. 1 except that the potential divider 10 includes an inductive element comprising a reactor 431 which is connected between its lower resistive portion 343A and the conductor 4. Preferably the reactor 431 is of such a value that the time constant of the potential divider or voltage-measuring circuit 10 (comprising resistive elements 343, 343A and inductive element 431) is approximately similar to the time constant of the motor circuit (comprising resistor 341, armature winding 6 and field winding 5). The purpose of the reactor 431 is to compensate, at least partially, for the effect of the time constant of the motor circuit upon the signal voltage $E_S$. For instance, if the converter output voltage between conductors 3 and 4 should suddenly fall, due for instance to a reduction of line voltage, the voltage $E_R$ across resistor 341 will fall less rapidly than the converter output voltage, thus tending to increase the signal voltage $E_S$ more than is required. However, the reactor 431 will delay the decrease of current in the potential divider circuit 10, so that the voltage $E_D$ across its upper portion 343 will decrease less rapidly and will tend to prevent any unwanted temporary increase in the signal voltage $E_S$.

Figure 4:
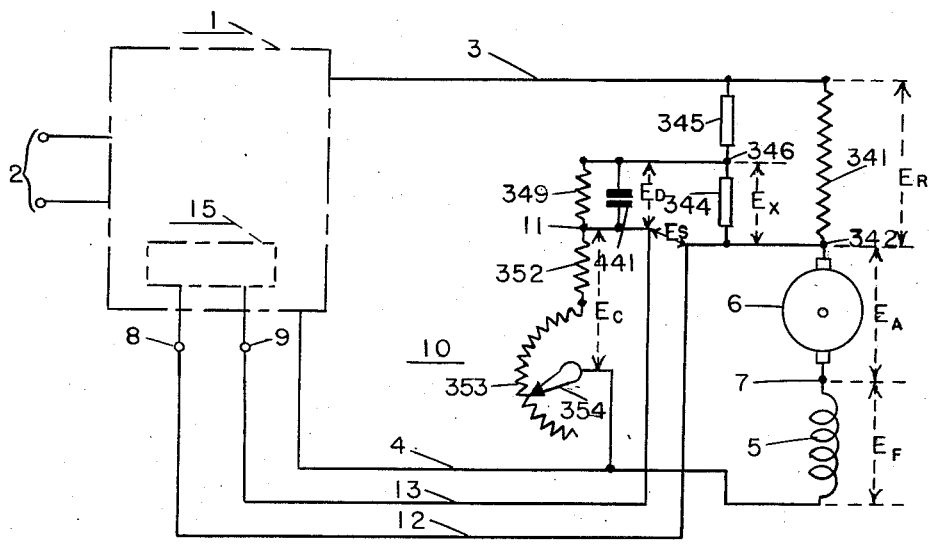

The arrangement shown in Fig. 4 is similar in many respects to that shown in Fig. 24 of my co-pending application previously mentioned; in Figure 4, resistance elements 344 and 345, being resistances of different voltage co-efficients are connected in series thru intermediate point 346 across resistor 341, to compensate for the effect of magnetic saturation as the current is varied in the motor. The path of potential divider 10 may be traced from the intermediate point 346 thru resistor 349, tapping point 11, resistor 352, rheostat 353 and slider 354 to conductor 4. The voltage across resistor 341 has been renamed $E_R$ for convenience.

As in Figure 24 of my co-pending application the resistive elements 344 and 345 are selected to have different voltage coefficients of resistance, such that the feedback voltage $E_X$ is, at all loads, approximately proportional to the field flux, in spite of magnetic saturation. However, it will be seen from Fig. 4 that the potential divider 10 is connected so that, assuming $E_S$ to be infinitesimally small, the ratio $$\frac{E_A + E_F}{E_X} = \frac{E_C}{E_D}$$

In other words, the ratio of total motor voltage to field flux is maintained at a constant value dependent upon the ratio of the potential divider; accordingly the motor speed is maintained substantially constant under all load conditions, as explained in connection with Fig. 1, in spite of the effect of magnetic saturation.

The purpose of the condenser 441 is to compensate, at least partially for the effect of the time constant of the motor circuit upon the signal voltage $E_S$.

In the event of a sudden reduction in the converter output voltage, the voltage $E_D$ across resistor 349 will fall less rapidly because of the capacitance of condenser 441, thus tending to prevent an unwanted temporary increase in the signal voltage $E_S$. The effect of the condenser 441 across the upper portion 349 of potential divider 10 in Fig. 4 is generally similar to the effect of the reactor 431 in series with the lower portion 343A of the potential divider 10 in the arrangement of Fig. 3.

Figure 5:
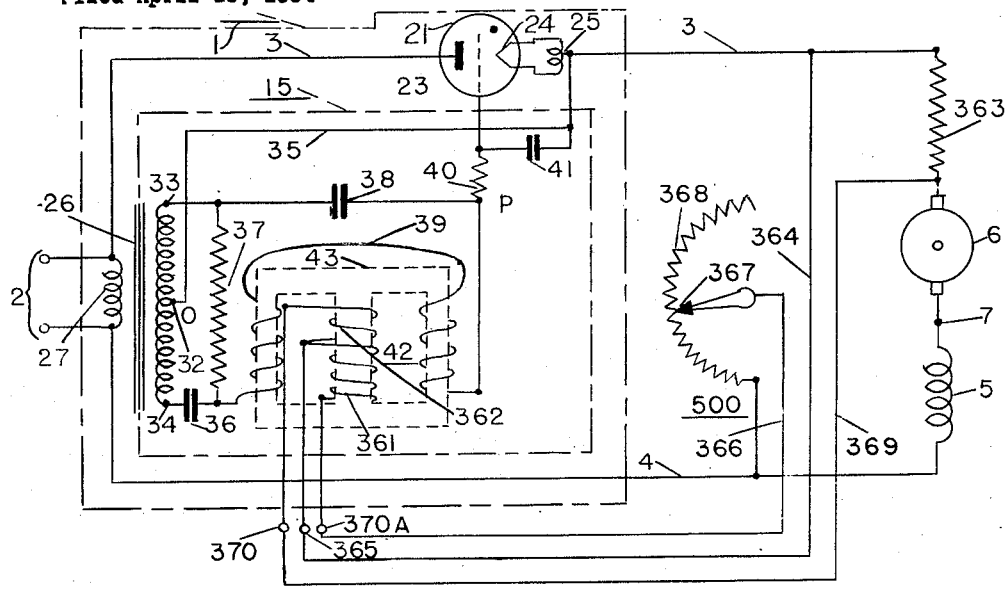

Fig. 5 shows an alternative arrangement. The converter 1 comprises the single vapor or gas-filled rectifier tube 21 having an anode 22, a control grid 23, and a cathode 24 which may be heated by the secondary winding 25 of transformer 26, the primary winding 27 of which is connected to the A. C. input terminals 2. The control device 15 comprises a phase shifter similar to that described in Fig. 5 of United States Patent No. 2,524,762 granted to applicant, and it operates in accordance with the vector diagram shown in Fig. 2 of said patent. The secondary winding 32 of transformer 26 forms a first branch circuit having end terminals 33 and 34, and an intermediate terminal O which forms a first output terminal of the phase shifter and is connected through conductor 35 to the center tap of the cathode transformer winding 25. A second branch circuit includes a capacitor 36 and a resistor 37. A capacitor 38 and a variable inductive element 39 are serially connected across the resistor 37 with a second output terminal P in the series connection between them. Said output terminal P is connected thru a filter resistor 40 to the grid 23, and a small capacitor 41 is connected from grid 23 to cathode winding 25 for the purpose of filtering out any high frequency transients. The variable inductive element 39 is formed by the series-connected A. C. windings of a saturable reactor 42, said windings being located on the two outer legs of a three-legged magnetic core 43 which is shown in dotted lines. A control winding 44 is located on the center leg, consisting of the component windings 361 and 362. The entire output voltage of the converter 1 is applied to the voltage-measuring circuit 500, which includes conductor 364, terminal 365, winding 361, terminal 370A with conductor 366 connected to slider 367. Slider 367 may be adjusted along resistor 368 which is connected to conductor 4 the "voltage-sensitive" winding 361 of the saturable reactor produces a "first" asymmetric magnetomotive force in the core 43 which is proportional to the total output voltage of the converter, which is equal to the total motor voltage plus the voltage across the series resistor 363. At the same time a "second" asymmetric magnetomotive force is produced in the opposite direction in core 43 by means of the "current-sensitive" winding 362, and this M. M. F. is dependent upon the motor current. The "current-sensitive" winding 362 is connected in parallel with the resistor 363 by means of terminals 365 and 370 and conductors 364 and 369. The arrangement will adjust itself so that the converter delivers sufficient output to maintain the first asymmetric M. M. F., from the voltage-sensitive winding 361, at a slightly lower value than the opposing second asymmetric M. M. F. from the current-sensitive winding 362, so as to develop a small resultant M. M. F. which controls the output of the converter; owing to the high sensitivity of the phase-shifting network, only a small resultant M. M. F. is required, and the first and second asymmetric magnetomotive forces will therefore be substantially equal. It will now be shown that this will result in a constant motor speed, neglecting the effect of magnetic saturation.

Using some of the terminology of Fig. 1, let:

$E_R$=voltage across series resistor 363.
$E_A$=armature voltage.
$E_F$=field voltage.
Let $R_A$=resistance of armature and $R_F$=resistance of field.
Let $I$=motor current and $\phi$=field flux.
Let $k_1$ and $k_2$ be constants, depending on the motor design.
Let R be the resistance of resistor 363 in parallel with winding 362.

Assuming that the converter has a pure D. C. output and that the motor field is free from magnetic saturation, we have:

Armature counter-E. M. F., $E_B = k_1 N \phi = k_2 N \cdot I$
Total armature voltage $E_A = E_B + I \cdot R_A$
$= k_2 N \cdot I + I \cdot R_A$
Field voltage $E_F = I \cdot R_F$
Voltage drop across series resistor $E_R = I \cdot R$
Total output voltage of converter $= E_R + E_A + E_F$ $$= I \cdot R + k_2 N \cdot I + I \cdot R_A + I \cdot R_F$$
$$= I(R + k_2 N + R_A + R_F)$$

The first asymmetric M. M. F. is proportional to this total output voltage. The second asymmetric M. M. F. is proportional to $I \cdot R$. When the first and second asymmetric M. M. F's are equal, we have:

$$I(R + k_2 N + R_A + R_F) = k_s \cdot I \cdot R$$

when $k_s$ is a constant depending upon the relative number of turns and resistances of windings 361 and 362, and upon the effective resistance of rheostat 368. Accordingly, $$R + k_2 N + R_A + R_F = k_s \cdot R$$

$$k_2 N = k_s R - R - R_A - R_F$$

$$N = \frac{k_s \cdot R - R - R_A - R_F}{k_2} = \text{constant}$$

Therefore the motor will run at a speed which is independent of the load, but which is dependent upon the constant $k_s$ which may be adjusted by adjusting the resistance of rheostat 368.

Figure 6:
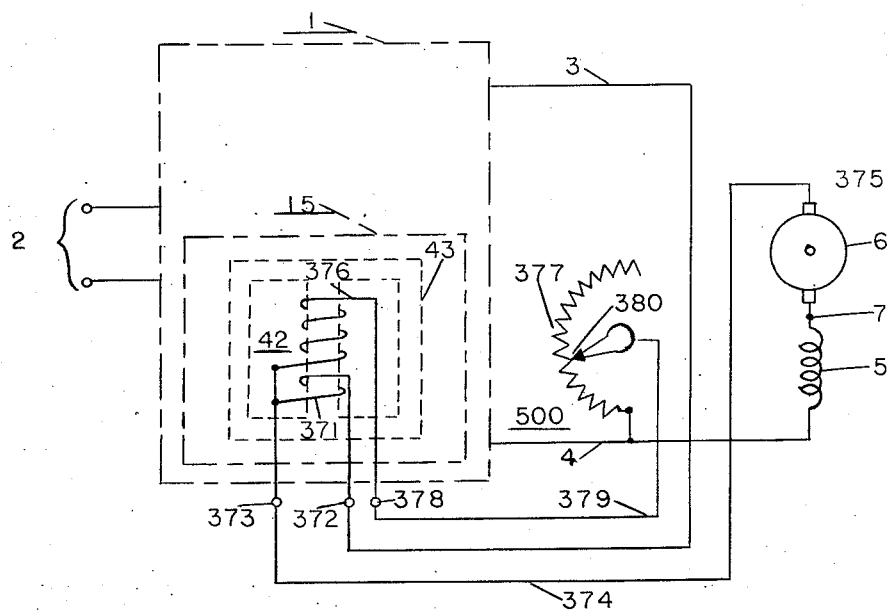

Fig. 6 illustrates an alternative arrangement which is similar in some respects to that of Fig. 20 of my copending application, the lower end of the voltage-measuring circuit 500 is connected to the conductor 4. The voltage-measuring circuit may be traced from armature terminal 375 through conductor 374, terminal 373, winding 376, terminal 378, conductor 379, slider 380 and rheostat 377 to the conductor 4 which is connected to the lower end of field winding 5; accordingly, the voltage-measuring circuit is connected across the whole of the motor, comprising the armature 6 and field winding 5, and the asymmetric magnetomotive force developed by the voltage-sensitive winding 376 is therefore proportional to the total motor voltage.

The current-sensitive winding 371 is connected to output conductor 3 thru terminal 372 and to the motor armature thru terminal 373 and motor armature terminal 375 to produce an opposing asymmetric magnetomotive force which is proportional to the field current. The output of the converter 1 is maintained at such a value that the two opposing magnetomotive forces developed by windings 371 and 376 are substantially equal, so that a constant ratio of total motor voltage to field current is maintained regardless of the motor load; this results in a constant motor speed, neglecting the effects of magnetic saturation, for reasons similar to those calculated in connection with Fig. 1.

Figure 7:
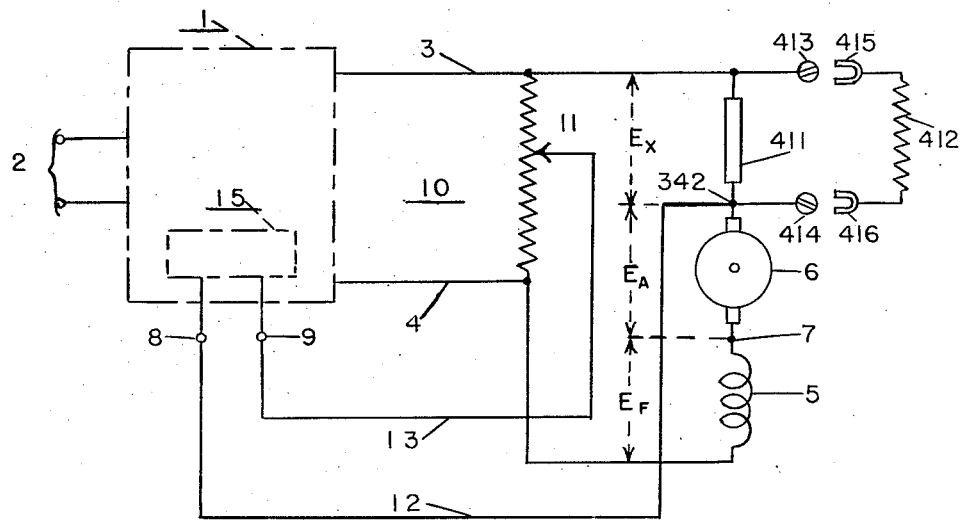

Fig. 7 illustrates an alternative arrangement which is similar to that of Fig. 1, except that a non-linear resistive element 411 is used instead of the resistor 341. This arrangement tends to maintain a constant ratio between the feedback voltage Ex (across the non-linear resistive element 411), and the total motor voltage $E_A + E_F$ (across the armature 6 and field winding 5).

By selecting the resistive element 411 to have a suitable voltage coefficient of resistance, as modified if required by the parallel connection of an additional linear resistor 412 thru connectors 413, 414, 415 and 416, it may be arranged that the feedback voltage Ex is substantially proportional to the motor field flux, allowing for the effects of magnetic saturation. Under these conditions, the motor speed may be maintained at a substantially constant value, regardless of load variations, in accordance with the calculations relating to Fig. 4.

Figure 8:
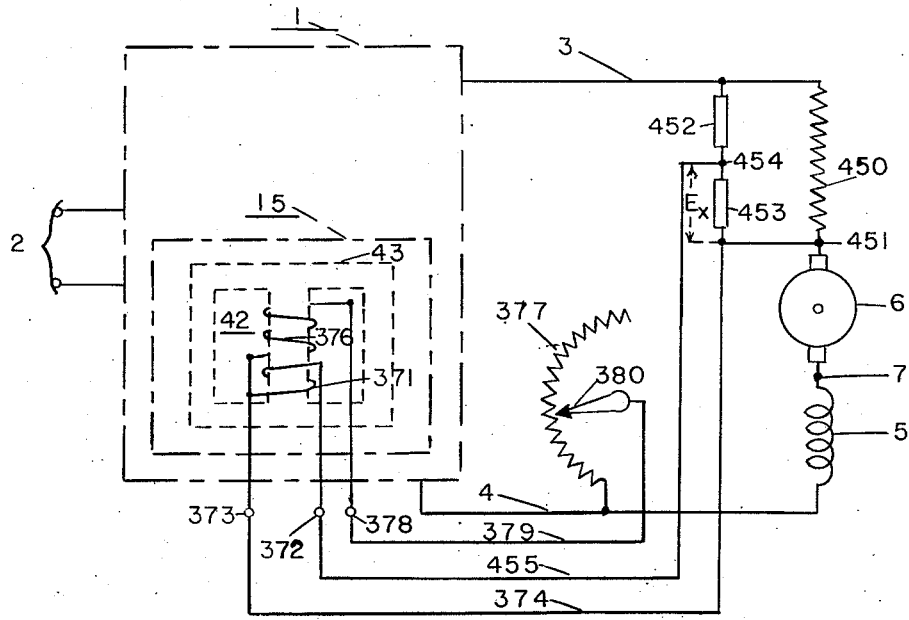

Fig. 8 illustrates an arrangement which is generally similar to that shown in Fig. 6, except that Fig. 8 includes means for compensating for the effects of magnetic saturation in the motor. Many of the parts of Fig. 8 are similar to those of Fig. 6 and they are similarly numbered and their description will not be repeated. However, in Fig. 8, a resistor 450 is connected in series with the motor between conductor 3 and the armature terminal 451. Resistive elements 452 and 453 are serially connected through an intermediate point 454, across the resistor 450, and at least one of said elements 452 and 453 has a high voltage coefficient of resistance; for instance the element 453 may comprise the material having the trade name "Thyrite" which has a high negative voltage coefficient, while the element 452 may comprise a linear resistor. The current-sensitive winding is connected across the element 453 so that it is energized by a feedback voltage Ex which is a non-rectilinear function of the field current and which may be arranged to be substantially proportional to the field flux, by suitable selection of the resistive elements 450, 452 and 453. Under these conditions, the arrangement of Fig. 8 can be adjusted to maintain an approximately constant ratio of field flux to total motor voltage, and therefore to maintain the motor speed substantially constant, irrespective of load and of magnetic saturation effects, for similar reasons to those which have been calculated with reference to Fig. 4.

Figure 9:
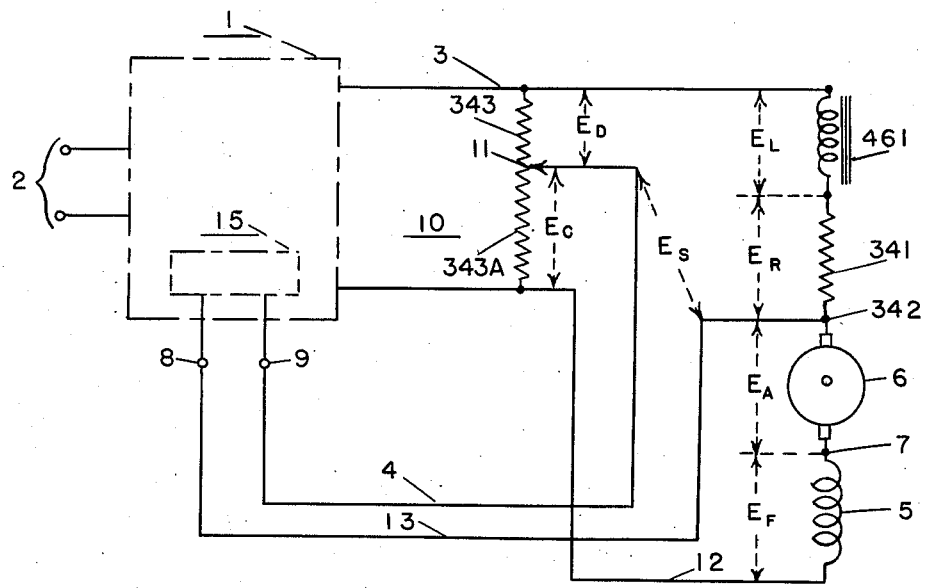

Fig. 9 illustrates an alternative arrangement in schematic form. Many of the parts are similar to those of Fig. 1 and those parts are similarly numbered and their description will not be repeated. In Fig. 9 however, an element 461 having inductive reactance is connected in series with the resistor 341 between the conductor 3 and the junction point 342. Preferably the inductive reactance 461 and the resistor 341 are chosen to have a time constant which is approximately similar to the time constant of the motor field winding 5 and armature winding 6, for the purpose of compensating, at least partially, for the effect of the motor time-constant on the signal voltage Es. For instance, if the mechanical load on the motor is suddenly increased, thus reducing the counter-E. M. F. and allowing the motor current to increase, the increase of motor current will simultaneously produce a transient increase in the voltages E$_L$ and E$_F$, across the inductive reactance 461 and the field winding 5, respectively. The transient increase in voltage E$_L$ tends to increase the signal voltage Es and will at least partially compensate for the effect of the unavoidable transient increase in field voltage E$_F$ which tends to decrease the signal voltage Es.

I claim:

1. A control system for a series-wound electric motor comprising: a controllable electric converter having at least two output terminals and a control device; a motor circuit comprising a current-sensitive element arranged for connection at least partially in series with said motor between said two output terminals; means for coupling said current-sensitive element to said control device; a voltage measuring circuit arranged for connection across at least that part of said motor circuit which includes the whole of said motor; and means for coupling said voltage-measuring circuit to said control device, whereby the output of said converter is variable in accordance with the current in said motor circuit and with the voltage across said motor.

2. The combination of claim 1 in which the converter has an electrical outut from said output terminals, which is controllable from a maximum value down to a predetermined minimum value.

3. The combination of claim 1, in which the current-sensitive element comprises at least one resistive element.

4. The combination of claim 3, in which the resistive element has a high negative voltage coefficient of resistance.

5. The combination of claim 3, in which the current-sensitive element comprises at least one resistive and inductive element.

6. The combination of claim 3, in which the current-sensitive element comprises a resistor, and a pair of resistive elements having different voltage coefficients of resistance, said resistive elements being serially connected across said resistor.

7. The combination of claim 1, in which the current-sensitive element comprises a control winding.

8. The combination of claim 1, in which the current-sensitive element comprises a resistor, and a control winding connected at least partially in parallel with said resistor.

9. The combination of claim 8, in which the current-sensitive element comprises a resistor; a pair of resistive elements having different voltage coefficients of resistance, said resistive elements being serially connected across said resistor; and a control winding connected across one of said resistive elements.

10. The combination of claim 1, in which the voltage-measuring circuit comprises a potential divider having a tapping point connected to said control device.

11. The combination of claim 10, in which the potential divider comprises resistive and reactive impedance portions, and the tapping point is located between said resistive and reactive impedance portions.

12. The combination of claim 10, in which the potential divider is connected across the output terminals of said converter.

13. The combination of claim 10, in which the potential divider has two portions divided by the tapping point, and one of said portions is connected across the motor.

14. The combination of claim 10, in which the current-sensitive element comprises a resistor and a pair of resistive elements having different voltage coefficients of resistance, said resistive elements being serially connected across said resistor, and in which said potential divider is connected across one said element and the whole of said motor.

15. The combination of claim 10, in which a condenser is also connected from said tapping point to another point on said potential divider.

16. The combination of claim 1, in which the voltage-measuring circuit comprises a control winding and a resistor connected in series with each other.

17. The combination of claim 16, in which said resistor is provided with an adjustable tapping, for varying the speed of the motor.

18. The combination of claim 16, in which the voltage-measuring circuit is connected across the output of said converter.

19. The combination of claim 16, in which the voltage-measuring circuit is connected across the whole of said motor.

20. The combination of claim 3, in which the current-sensitive element includes a pair of resistive elements having different voltage-co-efficients of resistance, whereby the motor speed is compensated for the effects of magnetic saturation in the motor.

21. A variable speed electric drive comprising: a controllable electric converter having a first and a second output terminal and a control device; a series wound electric motor comprising serially connected field and armature windings; a current-sensitive circuit connected in series with said motor across said output terminals to form an output circuit; a voltage measuring circuit connected electrically in parallel with at least that part of said output circuit which includes said field and armature windings; means for coupling said current-sensitive circuit and said voltage measuring circuit to said control device whereby the speed of said series motor is controlled by a quantity dependent upon the relation between the motor voltage and the motor current.

22. The combination of claim 21, in which said voltage measuring circuit is connected across said output circuit.

23. The combination of claim 21, in which said voltage measuring circuit is connected across said field and armature windings.

24. The combination of claim 21, in which said voltage measuring circuit is connected across said field and armature windings and across a part of said current-sensitive circuit.

25. A variable speed electric drive comprising: a controllable electric converter having a first and a second output terminal and a first and a second control terminal; a series wound electric motor having serially connected field and armature windings; a resistive circuit connected in series with said motor to form an output circuit; a potential divider, including a tapping point, connected in parallel with said motor and at least a part of said resistive circuit; means connecting said tapping point to one of said control terminals; and means connecting the other of said control terminals to a point on said resistive circuit.

26. The combination of claim 25, in which said resistive circuit also includes an inductance.

27. The combination of claim 25, in which said resistive circuit comprises a resistor, and two resistive elements having different voltage coefficients of resistance; said resistive elements being serially connected, through an intermediate point, across said resistor; said intermediate point being connected to one end of said potential divider.

28. The combination of claim 25, including a condenser connected between a point on said potential divider and a point between said armature and field windings.

29. A variable speed electric drive comprising: a controllable electric converter having a first and a second output terminal and a first and a second control terminal, the output of said converter being controllable from a maximum value down to a predetermined minimum value; a series wound electric motor having serially connected field and armature windings; a resistive circuit connected in series with said motor to form an output circuit; a potential divider, including a tapping point, connected in parallel with said motor and at least a part of said resistive circuit; means connecting said tapping point to one of said control terminals; and means connecting the other of said control terminals to a point on said resistive circuit.

30. A variable speed electric drive comprising: a controllable electric converter having a first and a second output terminal and a first and a second control terminal; a series wound electric motor having serially connected field and armature windings; a resistive circuit connected in series with said motor to form an output circuit; a potential divider, including a tapping point, connected in parallel with said motor and at least a part of said resistive circuit, in which said tapping point is adjustable to vary the speed of the motor; means connecting said tapping point to one of said control terminals; and means connecting the other of said control terminals to a point on said resistive circuit.

31. A control system for a series-wound electric motor comprising: a controllable electric converter having at least two output terminals and a control device; a motor circuit comprising a current-sensitive element arranged for connection at least partially in series with said motor between said two output terminals; means for coupling said current-sensitive element to said control device; a voltage measuring circuit arranged for connection across at least that part of said motor circuit which includes the whole of said motor, said voltage measuring circuit comprising a potential divider having a tapping point connected to said control device and in which said tapping point is adjustable to vary the speed of the motor; and means for coupling said voltage measuring circuit to said control device, whereby the output of said converter is variable in accordance with the current in said motor circuit and with the voltage across said motor.

References Cited in the file of this patent

UNITED STATES PATENTS

| | | |
|---|---|---|
| 2,289,171 | Baston | July 7, 1942 |
| 2,546,014 | Puchlowski et al. | Mar. 20, 1951 |
| 2,552,206 | Moyer | May 8, 1951 |
| 2,558,086 | Herchenroeder | June 26, 1951 |
| 2,558,094 | King | June 26, 1951 |

FOREIGN PATENTS

| | | |
|---|---|---|
| 580,005 | Great Britain | Aug. 23, 1946 |